United States Patent
Davidov

(10) Patent No.: US 11,206,910 B2
(45) Date of Patent: *Dec. 28, 2021

(54) DISPOSABLE PORTABLE POCKET FLUID/FLOSS DISPENSER

(71) Applicant: Mark Davidov, Kew Gardens, NY (US)

(72) Inventor: Mark Davidov, Kew Gardens, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/052,070

(22) Filed: Aug. 1, 2018

(65) Prior Publication Data

US 2020/0037728 A1 Feb. 6, 2020

(51) Int. Cl.
| | |
|---|---|
| *A61C 5/00* | (2017.01) |
| *A45D 34/00* | (2006.01) |
| *G09B 21/00* | (2006.01) |
| *A61C 15/04* | (2006.01) |
| *B65D 25/42* | (2006.01) |

(Continued)

(52) U.S. Cl.
CPC .............. *A45D 34/00* (2013.01); *A45D 42/00* (2013.01); *A61C 15/043* (2013.01); *B65D 25/42* (2013.01); *B65D 47/0804* (2013.01); *G09B 21/003* (2013.01)

(58) Field of Classification Search
CPC ........ A45D 34/00; A45D 42/00; A45D 40/24; A45D 2200/25; A61C 15/043; A61C 15/04; B65D 25/42; B65D 47/0804; B65D 21/0201; B65D 21/0233; B65D 77/06; B65D 35/22; B65D 83/0055; B65D 83/0094; B65D 35/28; B65D 81/32; B65D 81/3227; B65D 81/3233; B65D 11/188; B65D 25/40; B65D 21/02; B65D 47/20; G09B 21/003; B05B 11/02; B05B 11/048
USPC ....... 132/324, 322, 325, 323, 314, 315, 316, 132/309, 286; 220/23.2, 23.4, 23.86, 220/23.83, 23.89, 23.88, 23.87, 503, 524, 220/4.21, 4.24; 206/514, 581, 38, 37, 206/225, 226, 229; 222/94, 95, 105, 132, 222/135, 212–215, 190, 192; 239/329, 239/327, 289, 197, 198; D28/66; 401/184; D9/529; 225/39
See application file for complete search history.

(56) References Cited

U.S. PATENT DOCUMENTS

| | | | | |
|---|---|---|---|---|
| 1,194,187 | A * | 8/1916 | Kendall | ............... A45D 33/006 |
| | | | | 132/299 |
| 1,454,429 | A * | 5/1923 | Dresser | ................ A61C 15/043 |
| | | | | 242/138 |

(Continued)

FOREIGN PATENT DOCUMENTS

FR 2443980 A1 * 7/1980 ......... B65D 81/3266

*Primary Examiner* — Rachel R Steitz
(74) *Attorney, Agent, or Firm* — Law Office Richard B Klar; Richard B Klar, Esq.

(57) ABSTRACT

A disposable, portable and compact fluid and floss dispenser that is substantially rectangularly shaped with dispensers for fluid located at each of the four slanted configured corners and a spindle for dispensing floss and a mirror located on the bottom surface of the dispenser housing. In one embodiment two layers or sections are connected together. Nozzles are provided on a housing portion that is adapted to connect preferably by being form fitted onto the container to dispense fluid, drops or foam.

15 Claims, 15 Drawing Sheets

(51) Int. Cl.
  *B65D 47/08* (2006.01)
  *A45D 42/00* (2006.01)

(56) References Cited

U.S. PATENT DOCUMENTS

| | | | | |
|---|---|---|---|---|
| 2,533,495 A * | 12/1950 | Moffett | B65H 75/143 | 242/129 |
| 2,790,609 A * | 4/1957 | Hawthorne | B65H 35/0026 | 225/26 |
| 2,893,405 A * | 7/1959 | Castelli | A61C 15/043 | 132/321 |
| 3,074,546 A * | 1/1963 | Burgess | G03B 21/323 | 206/406 |
| 3,405,798 A * | 10/1968 | Peterson | B65D 85/00 | 206/405 |
| 3,407,923 A * | 10/1968 | Mathus | B65D 85/00 | 206/406 |
| 3,451,541 A * | 6/1969 | Posso | G11B 23/027 | 206/406 |
| 3,469,681 A * | 9/1969 | Norman, Jr. | G03B 21/323 | 206/405 |
| 3,498,447 A * | 3/1970 | Edwards | G11B 23/027 | 206/406 |
| 3,504,652 A * | 4/1970 | Norman | G03B 21/323 | 116/309 |
| 3,540,578 A * | 11/1970 | Jones | B65D 85/672 | 206/406 |
| 3,700,098 A * | 10/1972 | Posso | G03B 21/323 | 206/406 |
| 3,862,555 A * | 1/1975 | Wirth | E05B 63/12 | 70/63 |
| 3,863,762 A * | 2/1975 | Arai | B65H 75/16 | 206/405 |
| 3,897,005 A * | 7/1975 | Reiner | A45D 37/00 | 239/327 |
| 4,083,449 A * | 4/1978 | Rubins | G11B 23/027 | 206/405 |
| 4,327,755 A * | 5/1982 | Endelson | A61C 15/043 | 132/324 |
| 4,364,474 A * | 12/1982 | Hollander, Jr. | B65D 75/48 | 206/219 |
| 4,520,921 A * | 6/1985 | Vissing | B65D 50/046 | 206/1.5 |
| 4,562,923 A * | 1/1986 | Katada | A45D 40/24 | 132/314 |
| 4,662,541 A * | 5/1987 | Fossati | A45D 34/02 | 222/135 |
| 4,676,370 A * | 6/1987 | Rudick | G11B 23/027 | 206/1.5 |
| 4,702,373 A * | 10/1987 | Meade | G11B 23/027 | 206/226 |
| 4,881,560 A * | 11/1989 | Blank | A61C 15/043 | 132/324 |
| D309,959 S * | 8/1990 | Endelson | D28/66 | |
| 4,980,955 A * | 1/1991 | Krauss | A44B 99/005 | 24/594.1 |
| 5,013,173 A * | 5/1991 | Shiraishi | A45D 34/041 | 401/202 |
| 5,027,949 A * | 7/1991 | Terwilliger | G11B 23/027 | 206/405 |
| 5,076,423 A * | 12/1991 | Russack | A61C 15/043 | 132/325 |
| 5,180,090 A * | 1/1993 | Douglas | A61C 15/043 | 225/42 |
| D334,249 S * | 3/1993 | Whittaker | D28/66 | |
| 5,482,172 A * | 1/1996 | Braddock | B65D 1/06 | 215/237 |
| D368,986 S * | 4/1996 | Haber | D28/66 | |
| 5,582,195 A * | 12/1996 | Nagel | A61C 15/043 | 132/324 |
| 5,622,283 A * | 4/1997 | Morrison | A46B 5/0095 | 222/103 |
| 5,649,659 A * | 7/1997 | Saunders | A61C 15/043 | 132/325 |
| 5,678,580 A * | 10/1997 | Sherman | A61C 15/043 | 132/324 |
| 5,722,439 A * | 3/1998 | Endelson | A61C 15/043 | 132/321 |
| 5,787,907 A * | 8/1998 | Endelson | A61C 15/043 | 132/321 |
| 6,145,722 A * | 11/2000 | Behrens | B65H 35/0026 | 206/403 |
| 6,257,405 B1 * | 7/2001 | Painsith | A45C 11/00 | 206/234 |
| 6,460,781 B1 * | 10/2002 | Garcia | A45D 37/00 | 222/107 |
| 6,554,218 B2 * | 4/2003 | Buyce | B65H 75/143 | 242/388.6 |
| 6,571,940 B2 * | 6/2003 | Newman | A45C 11/00 | 206/234 |
| 6,585,112 B2 * | 7/2003 | Levin | A45C 11/182 | 206/39 |
| 6,663,019 B2 * | 12/2003 | Garcia | A45D 37/00 | 222/630 |
| 6,715,603 B1 * | 4/2004 | Uribe | A61C 15/00 | 206/232 |
| D491,313 S * | 6/2004 | Schrott | D28/66 | |
| 6,769,579 B2 * | 8/2004 | Milian | B05B 11/3077 | 222/212 |
| 6,811,057 B2 * | 11/2004 | Duquet | B65D 75/38 | 222/105 |
| 7,267,126 B1 * | 9/2007 | Banegas | A45D 44/18 | 132/309 |
| 7,296,944 B2 * | 11/2007 | Steinschaden | B43K 5/005 | 401/209 |
| 7,344,023 B2 * | 3/2008 | Painsith | A45D 29/20 | 206/234 |
| 7,350,677 B2 * | 4/2008 | Duquet | B65D 75/5811 | 222/209 |
| D593,420 S * | 6/2009 | Augenbraun | D9/529 | |
| 7,665,600 B1 * | 2/2010 | Griffin | A61C 15/043 | 132/324 |
| D619,767 S * | 7/2010 | Antler | D28/66 | |
| 7,841,350 B2 * | 11/2010 | Kernot | A61C 15/043 | 132/323 |
| D645,087 S * | 9/2011 | Fung | D19/69 | |
| 8,272,389 B2 * | 9/2012 | Bish | A45D 42/00 | 132/316 |
| 8,469,236 B2 * | 6/2013 | Kharas | B05B 11/0027 | 222/173 |
| D710,179 S * | 8/2014 | Thomas | D8/105 | |
| D715,155 S * | 10/2014 | Meyers | D9/687 | |
| 9,125,713 B2 * | 9/2015 | Zajac | A61C 15/04 | |
| 2003/0029472 A1 * | 2/2003 | Adler | A61C 15/046 | 132/325 |
| 2003/0071076 A1 * | 4/2003 | Tenzer | A45D 34/02 | 222/385 |
| 2005/0230425 A1 * | 10/2005 | Genosar | B05B 11/00412 | 222/207 |
| 2008/0023575 A1 * | 1/2008 | Trumble | B05B 11/0038 | 222/135 |
| 2008/0060675 A1 * | 3/2008 | Keiser | A61C 15/04 | 132/322 |
| 2008/0073372 A1 * | 3/2008 | Keller | A61J 1/2093 | 221/94 |
| 2008/0257377 A1 * | 10/2008 | Burrows | A61Q 11/00 | 132/322 |
| 2010/0096413 A1 * | 4/2010 | Genosar | B05B 11/0041 | 222/207 |
| 2012/0241465 A1 * | 9/2012 | Genosar | B05B 11/048 | 222/1 |
| 2014/0231303 A1 * | 8/2014 | Musabbir | A45D 40/24 | 206/581 |
| 2015/0122840 A1 * | 5/2015 | Cox | B65D 75/5877 | 222/159 |

* cited by examiner

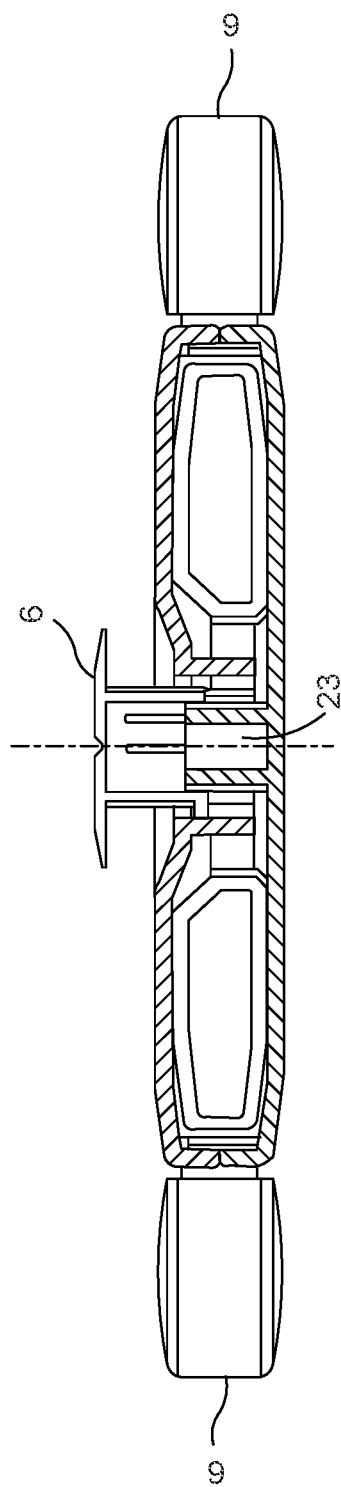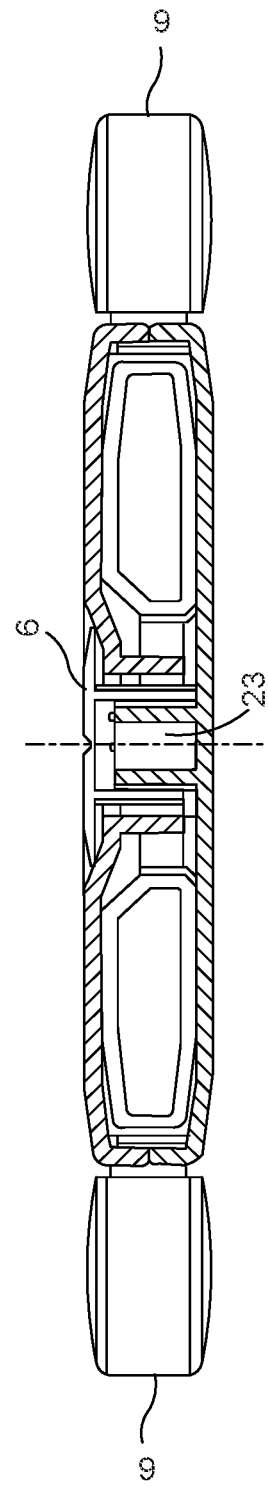

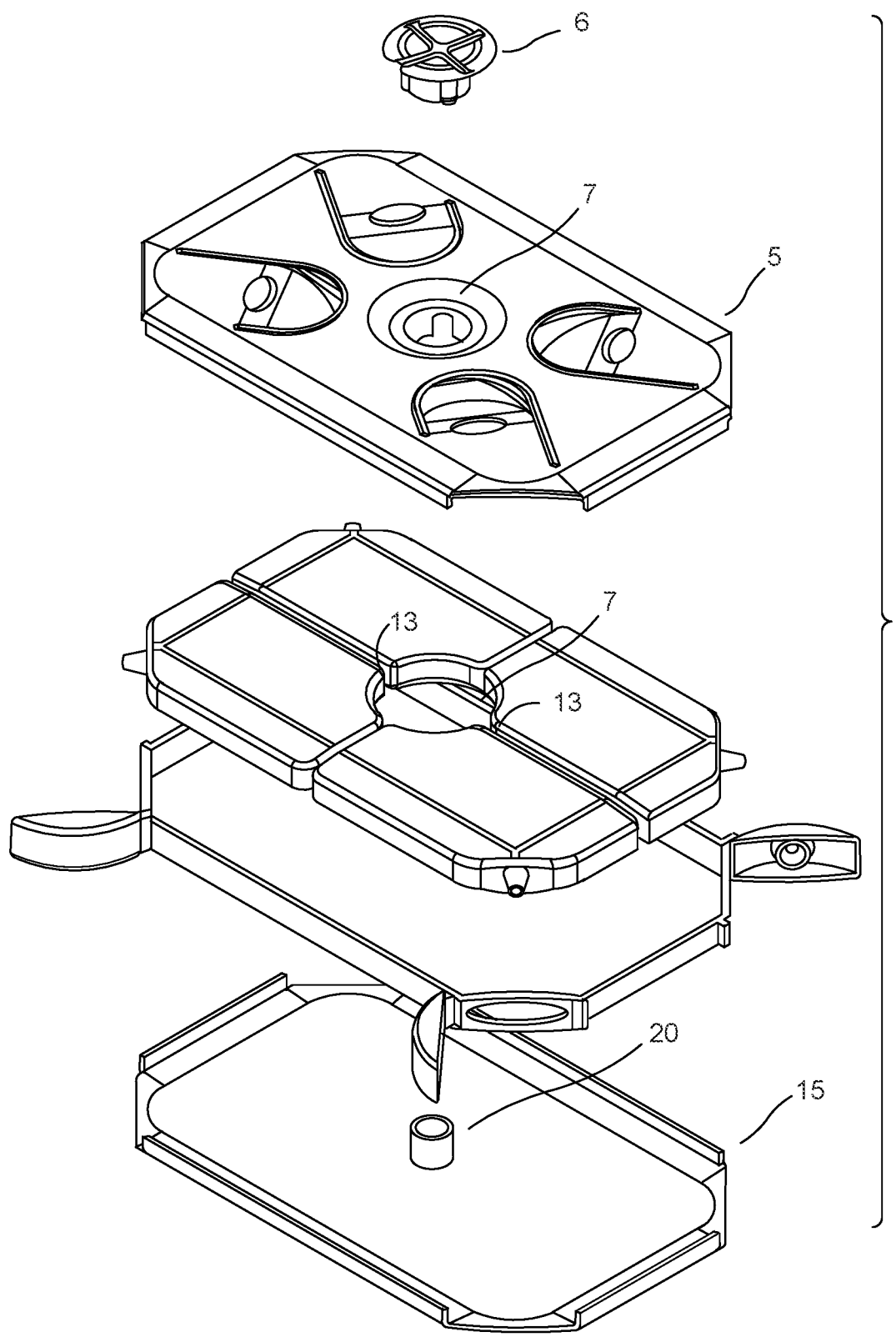
F I G. 3

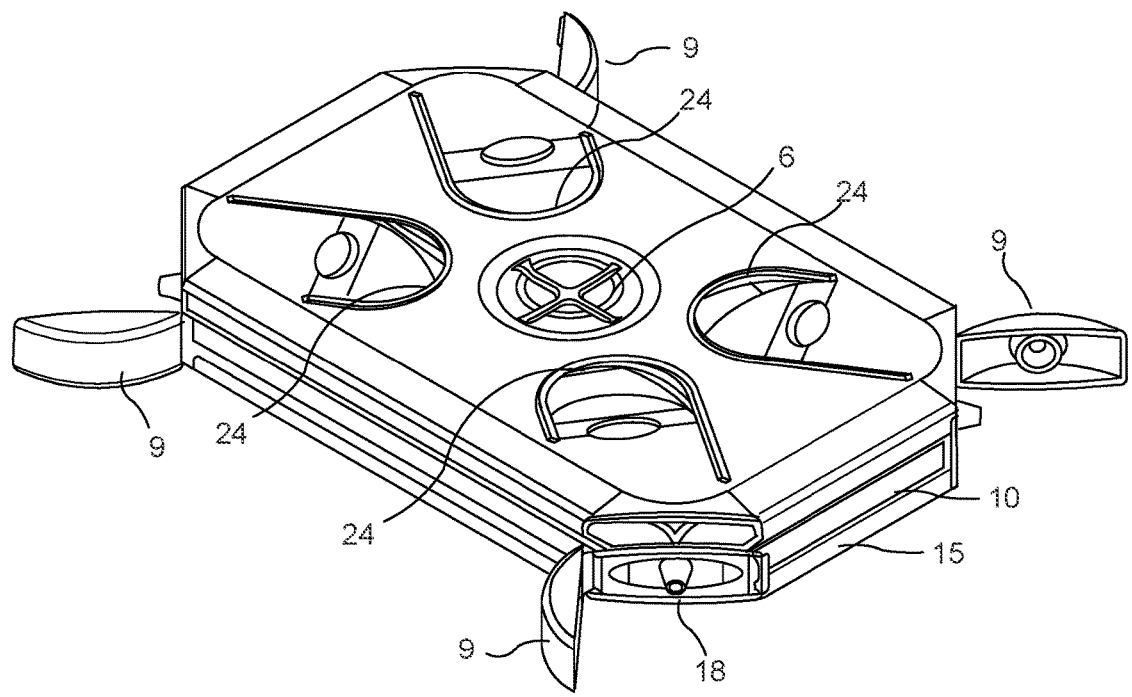
F I G. 5A
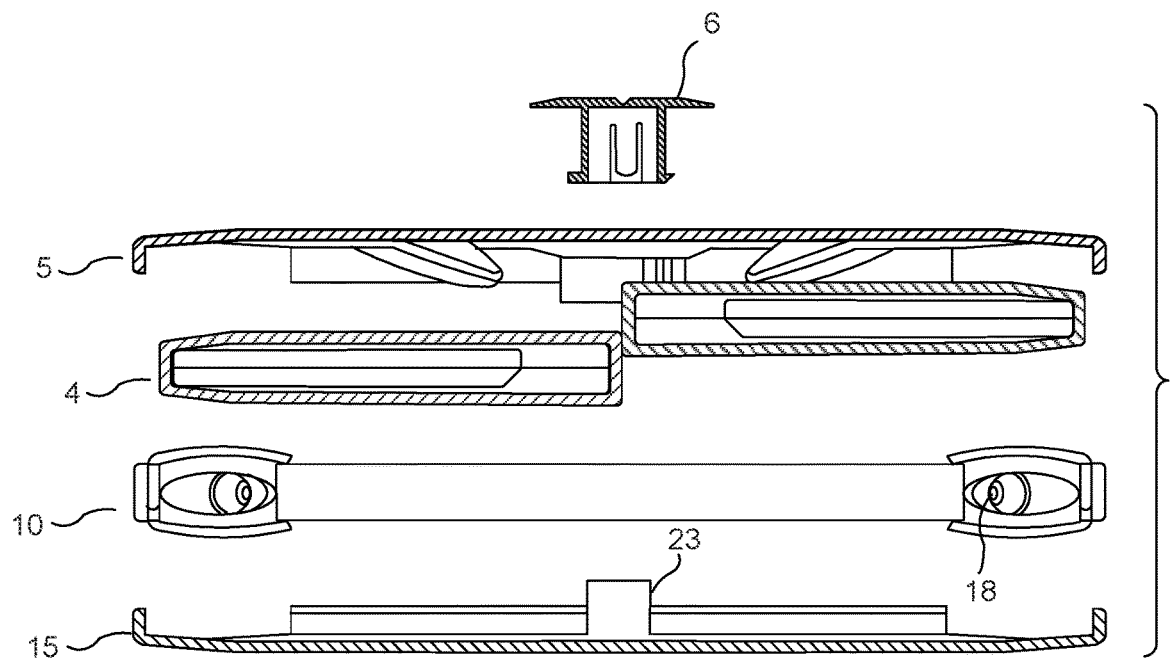
F I G. 5B

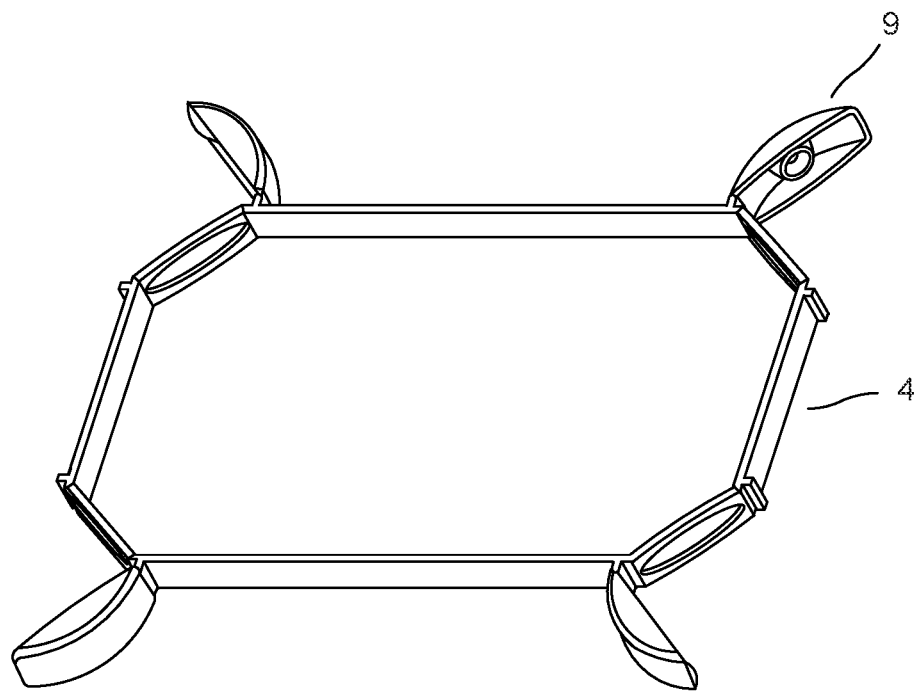
F I G. 6A
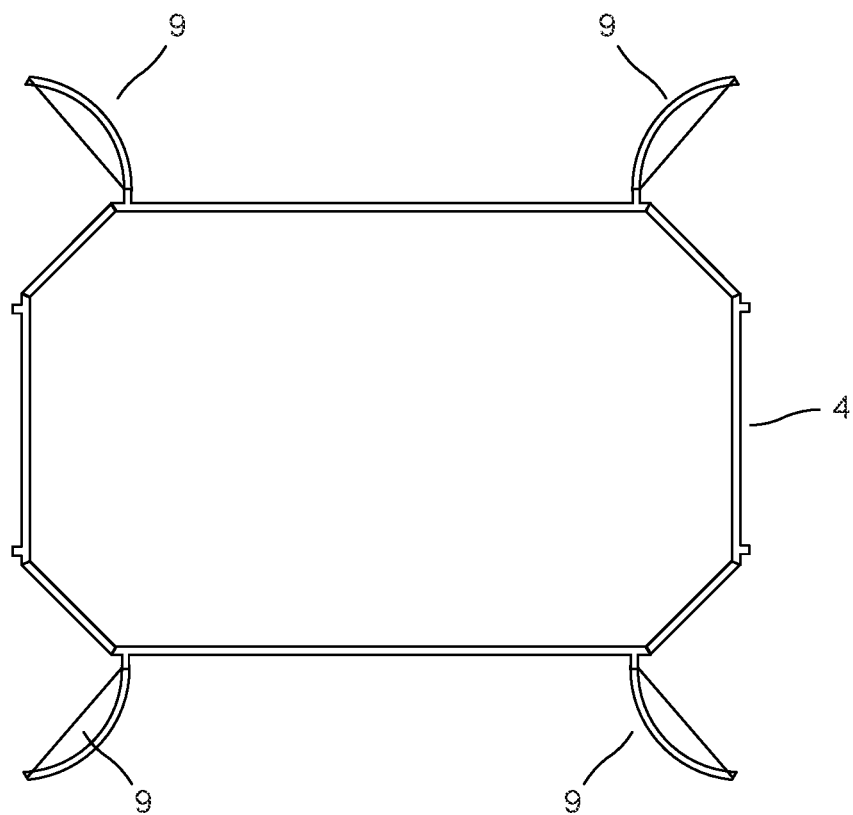
F I G. 6B

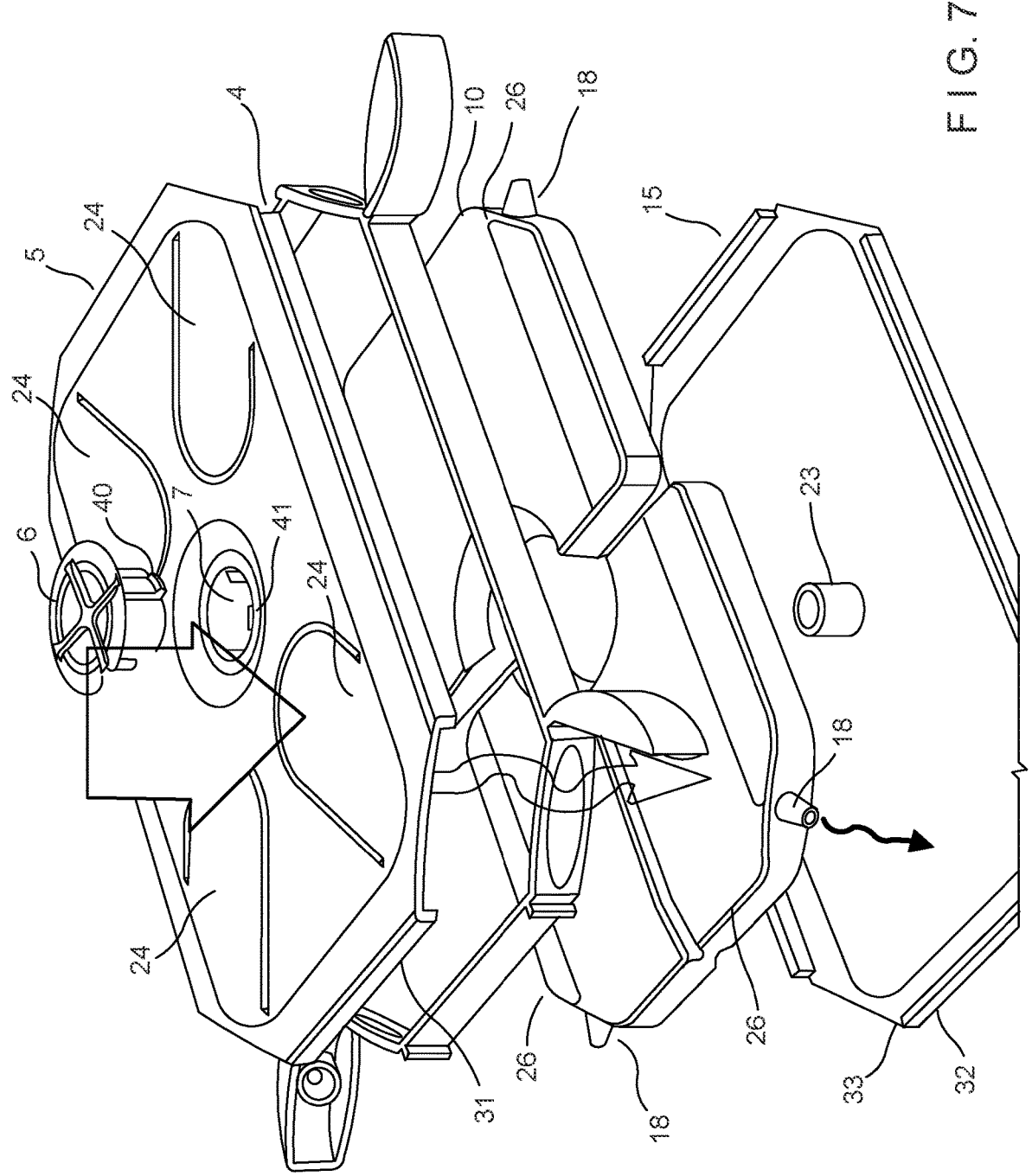

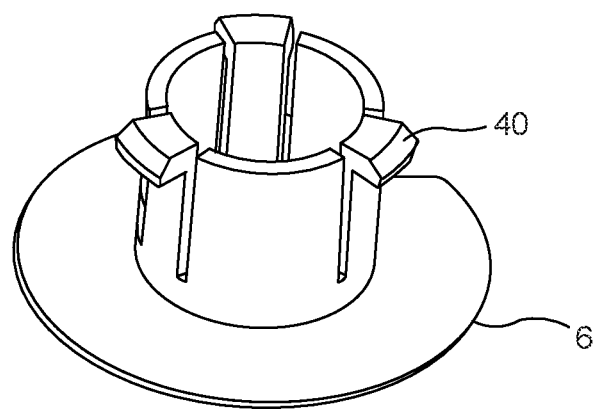
F I G. 8A
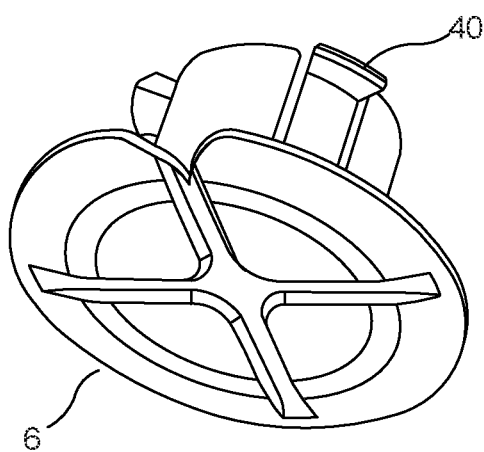
F I G. 8B

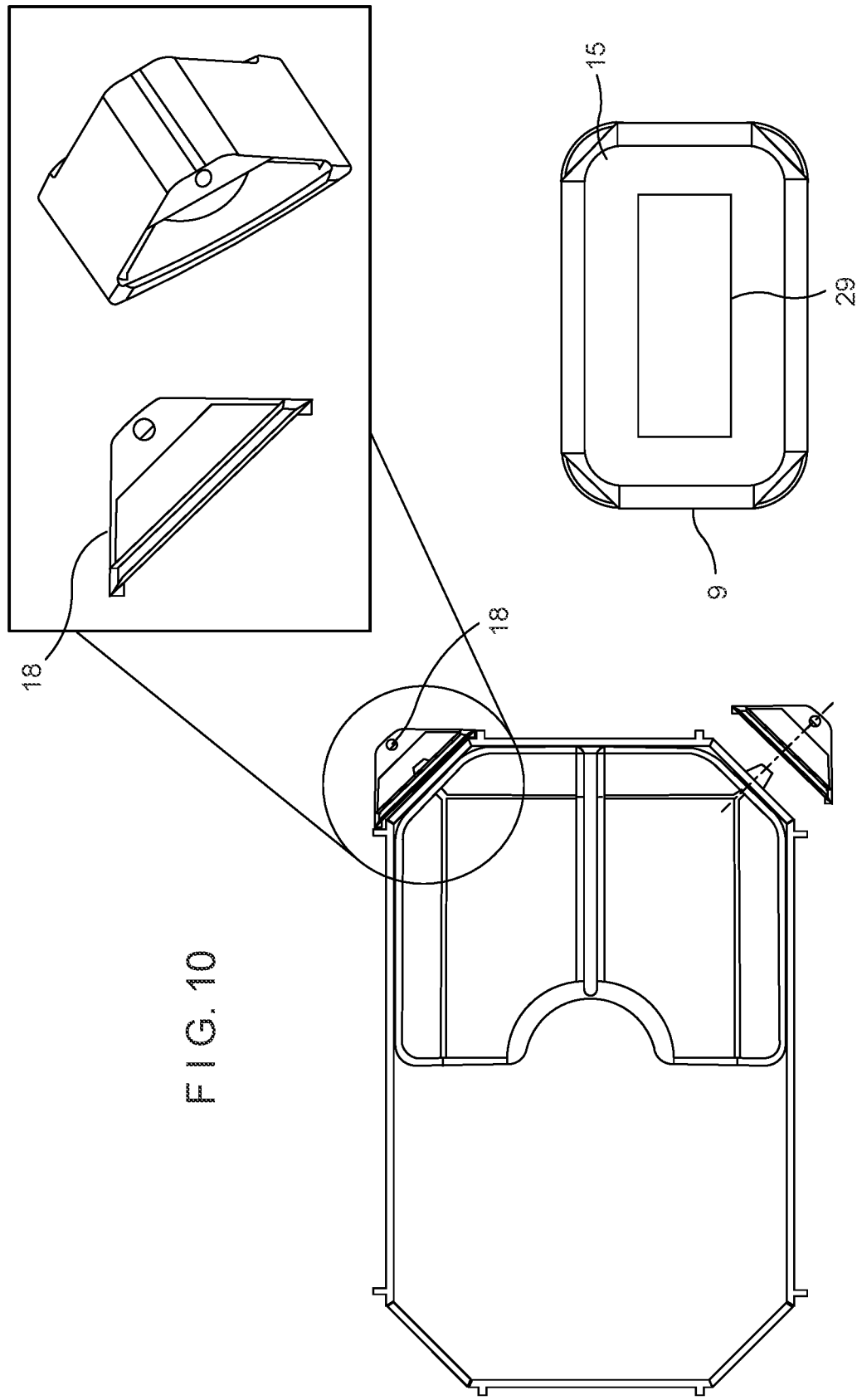

DISPOSABLE PORTABLE POCKET FLUID/FLOSS DISPENSER

The present application is a continuation-in-part of U.S. Ser. No. 15/917,213 filed on Mar. 9, 2018 which in turn is a continuation-in-part of U.S. Ser. No. 15/832,160 filed on Dec. 5, 2017 and claims priority thereunder pursuant to 35 USC 120. Provisional Application U.S. Ser. No. 62/432,234 was filed on Dec. 9, 2016 by the Applicant.

BACKGROUND

I. Field

The present invention relates to a disposable portable pocket fluid and floss dispenser. In particular, the present invention relates to a portable compact device for dispensing fluid such as liquid medication, mouthwash, eyedrops, etc. and a dispenser for floss with a mirror located on the bottom surface of the compact device that is thin and be carried in a pocket by a user.

2. The Related Art

SUMMARY

The present invention provides a disposable, portable and compact fluid and floss dispenser that is substantially rectangularly shaped with at least one or more or other fluid or foam dispensing mechanisms with dispensers for fluid. The one or move dispensers can be preferably located at any one or more of the four slanted configured corners. The present invention includes a spindle for dispensing floss and a mirror located on the bottom surface of the dispenser housing.

BRIEF DESCRIPTION OF THE DRAWINGS

FIG. 2A-2B shows the floss spindle of the present invention in which:

FIG. 2A shows the floss spindle in it popped up position for dispensing floss; and FIG. 2B shows the floss spindle pressed down and locked din place within the dispenser of the present invention;

FIG. 3 is a partially exploded perspective view of the present invention;

FIG. 5A-5B show the activation mechanism for dispensing fluid or foam though the nozzles of the present invention in which:

FIG. 5A is a perspective view of the present invention wherein the pressure buttons are depressed thereby pressing on the fluid or foam or drops containers of the second layer of the present invention to dispense the fluid or foam through the nozzles;

FIG. 5B illustrates the activation mechanism for dispensing fluid or foam though the nozzles of the present invention;

FIGS. 6a-6B show the frame for the present invention in which:

FIG. 6A is a perspective view of the frame housing and encasing and securely holding the first, second and third layers of the present invention in place; and FIG. 6B is a top view of FIG. 6A;

FIG. 7 is a partially exploded perspective view showing how the pressure buttons activate the fluid foam or drop containers to dispense through the nozzles and how the floss spindle is engaged and disengaged for dispensing floss;

FIGS. 8A and 8B show the floss spindle engaging mechanism in which:

FIG. 8A shows a top perspective view of the mechanism;

FIG. 8B shows a bottom perspective view of the engagement mechanism;

FIG. 10 shows a spray nozzle of the present invention; and

FIG. 11 shows a bottom view of the third layer the present invention with a mirror thereon;

FIG. 12 shows a top and bottom exterior surface of the housing for this second embodiment of the present invention;

FIG. 13 shows a close up of one of the nozzles;

FIG. 14 shows an interior surface of the top and bottom surfaces of the housing with the floss wound inside one of the interior surfaces of the housing and a container that is adapted to be placed inside a hollowed out region of the interior surface of the housing where said container has the nozzles therein;

FIG. 15 shows the top and bottom surfaces of the housing with the floss wound and the container for the nozzles for insertion into a hollowed out region of the interior surface of the housing;

FIG. 16 shows the exterior top surface of the container.

FIG. 17 shows the exterior bottom surface of the container; and

DETAILED DESCRIPTION OF THE PREFERRED EMBODIMENTS

Figure 1:
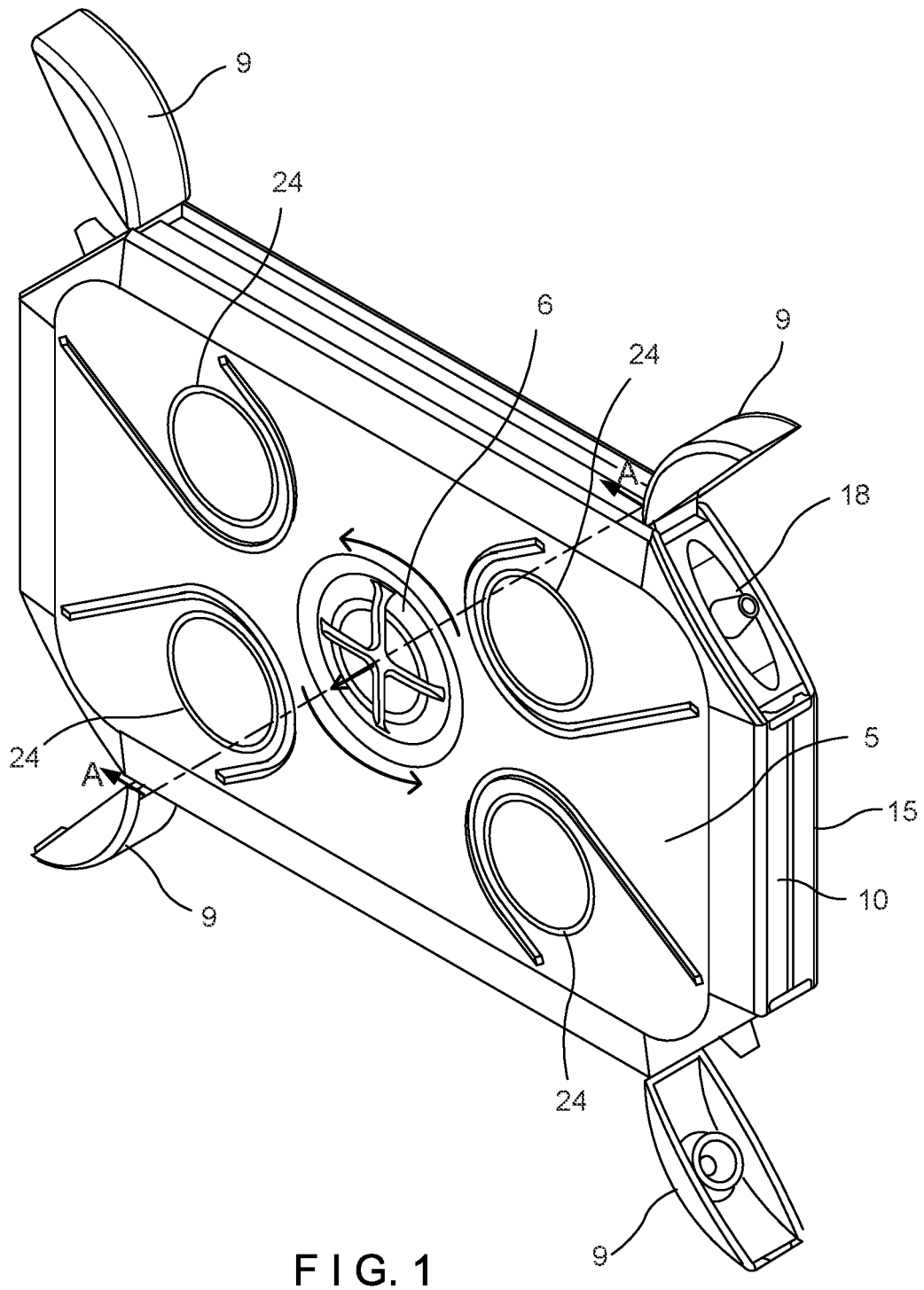
FIG. 1 shows a first embodiment with nozzle disposers for fluids a perspective view of the present invention.
Figure 4A:
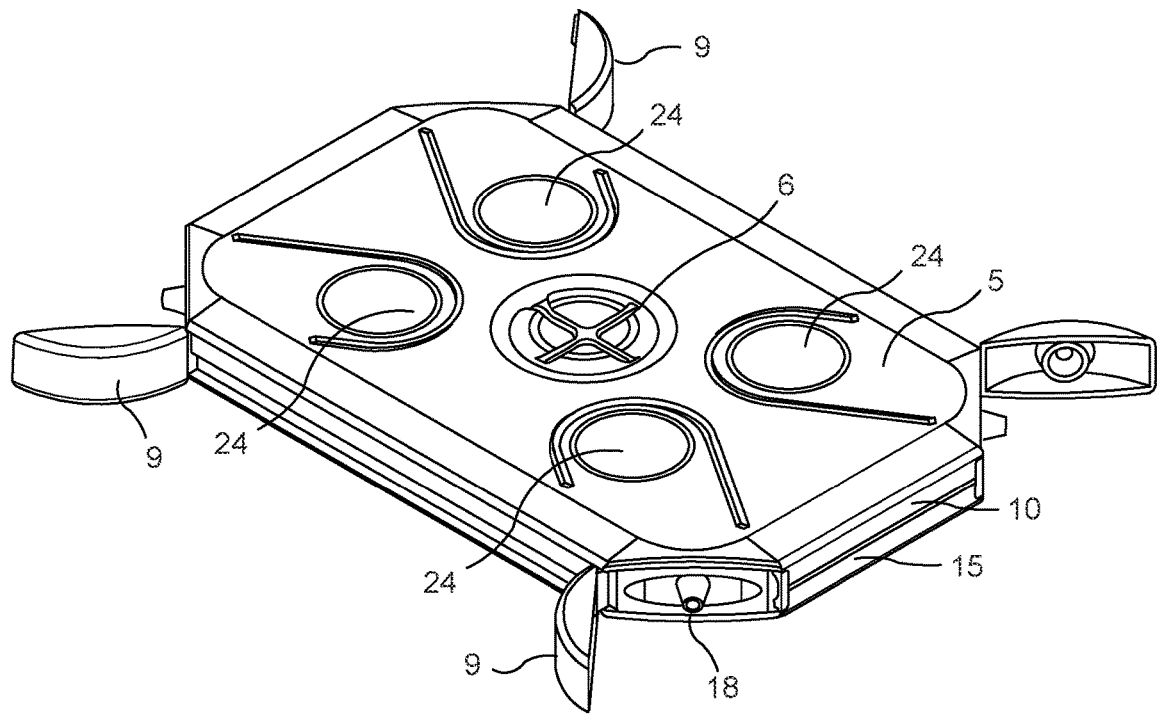
FIG. 4A is a perspective view of the present invention wherein the pressure buttons are not depressed.
Figure 4B:
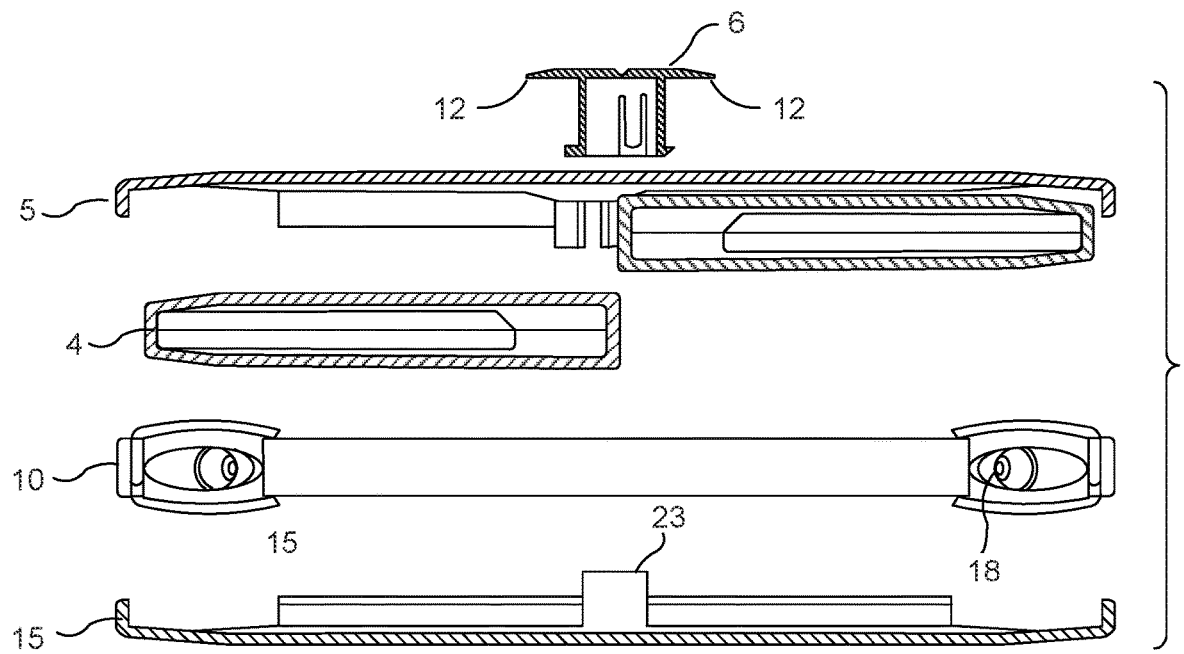
FIG. 4B is a sectional view of FIG. 4A.
Figure 9:
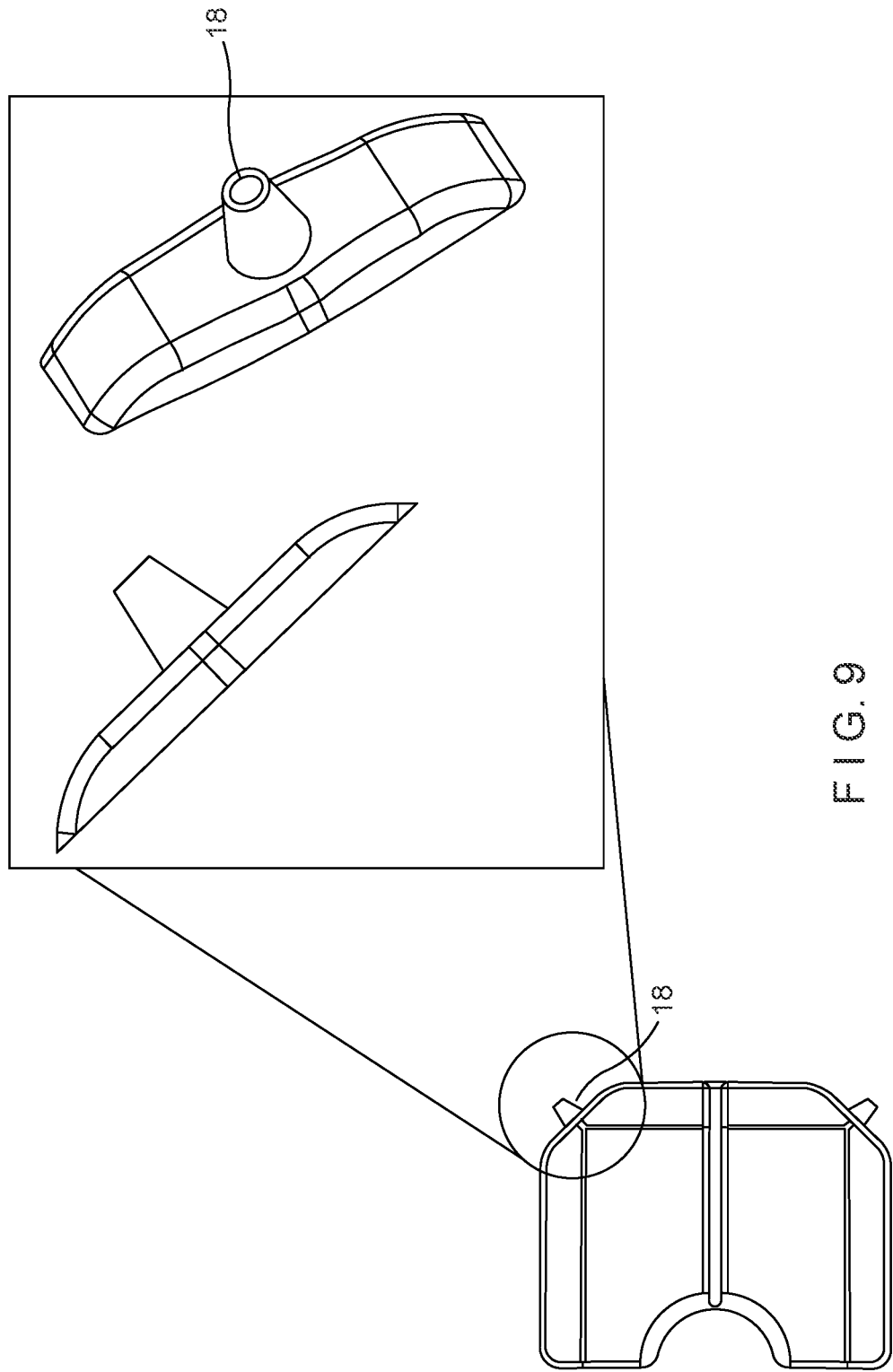
FIG. 9 shows a fluid nozzle of the present invention.

The present invention relates to a portable pocket fluid and floss dispenser suitable for dispensing fluids such as mouthwash, fluid headache medication, hand gels, shampoo, liquid or foam having one or more liquid or foam dispensers or one or more spray dispenser nozzles. The present invention can be equipped with any fluid or foam dispensing mechanism including but not limited to nozzles, droppers, sprays, foam sprays or fluid sprays. Referring now to the drawings of FIGS. 1-2F, FIG. 1 shows an embodiment of the present invention which has three layers or sections 5, 10 and 15 and an outer frame 4 housing and connecting the three layers 5, 10 and 15 together. The three layers 5, 10 and 15 include a top layer 5 having a pop up floss spindle 6 which pops up when pressed and/rotated as shown in FIG. 1. The top layer 5 of the device has a spindle portion 6 underneath onto which floss 26 is wound about the dispenser. As can be seen in the third and bottom layer 15 there is a holder for the pop up spindle mechanism 6 for the floss dispenser and an opening 7 that goes through each of the second layer 10 in order to provide a firm holding connection for the spindle 6 with the holder of the spindle. The top layer 5 has an opening with a rim surface 12 and a catch mechanism 13 so that when the spindle 6 is pressed downward and rotated in one direction it will engage the catch mechanism 13 and pop up so a user can dispense floss 26. When the spindle 6 is pressed down and rotated again it will engage the rim 12 moving away from the catch mechanism 13 and stay locked in place so that the top surface of the spindle 6 is flush with the top surface of the top layer 5 of the present invention.

The frame 4 of the present invention is preferably rectangularly shaped and has 4 corners that are slanted or angled in which the one or more nozzles are provided on the third layer 15 of the housing 1 to dispense fluid. As shown in FIG. 1 the nozzles 18 can be liquid dispensers. Alternatively as shown in FIG. 2C it can be one or more spray dispensers or alternatively it can be foam dispensers depending on the fluid or foam to be dispensed. It is also possible for the present invention to have a mix of different nozzles 18 of each of these dispensers such as two fluid dispensers, a form dispenser and a spray dispenser including a fluid dispenser can be configured as an eye drop dispenser for dispensing eye drop medication or contact lens fluid. The one or more nozzles 18 can have a cover or lid on them as shown in FIG. 2C. The present invention is preferably manufactured of polypropylene plastic material or else any other suitable alternative plastic material. The 3 layers 5, 10 and 15 shown in FIG. 1 can snap together assemble to a relatively thin container or housing 1 for dispensing fluids that can be disposable, portable and fit into a pocket of a user. The frame 4 is fixedly connected to the three layers 5, 10 and 15 preferably with adhesive material making the present invention a disposable device.

The size of the container or housing 1 is preferably the size of a credit card. Alternative plastic materials for the container include polycarbonate/ABS polyester thermoplastic polyphenylene oxide, poly pehenylne sulfide polystyrene and also polystyrene high impact in addition styrene acrylonitrile can be used. In FIG. 1 the first top layer 5 has the spindle 6 thereon. There are also squeezable plastic pressure flaps that bend downward to put pressure on a respective one of the a fluid or foam container in the second layer of the present invention to disuse the fluid or foam therein through its respective nozzle 18 as shown in FIG. 1 thereby pressing the dispensed fluid or foam from the nozzles 18. Alternatively each nozzle 18 can have an activation button on it (not shown) which can be manually pressed by a user to dispense the fluid, foam or spray through its respective nozzle 18.

The second layer 10 underneath the top layer 5 contains the one or more nozzles 18 preferably on at least one of the 4 slanted corners, the frame 4 contains a covering for the nozzles 18 on each of the 4 corners where the covering can be manufactured as a hinge mechanism such as but not limited to a living hinge to open or close out by simply flipping it open or close and a bottom layer which contains the holder for the spindle 6. Underneath the bottom of the surface of the bottom layer 15 as shown in FIG. 2F is a mirror 29 for the user to use when flossing his teeth or combing his hair, etc. There is an overleaf on the top layer 5 which engages with the overleaf of the bottom layer 15 the overleaf is to be ultrasonically welded to the top layer 5 and will fit inside the recess and will close tightly with the bottom layer to keep the entire container in place. Preferably the second layer 10 would be made of a high density polyethylene plastic material and the layer underneath that would be made of a polypropolene material. In operation the present invention works as follows. A user would take the assembled version of the present invention and dispense fluid by pressing on one of the one or more and preferably four plastic pressure points after flipping open the cap on the corresponding nozzle 18 to dispense fluid. This may be either one of the aforementioned fluids or foams noted above. These user may also press on the floss dispenser holder at the top surface 5 to release the pop up the spindle 6 and release floss 26 as can be seen there is a detachable engagement between the spindle 6 and a mechanism 13 for catching it in place as shown in the top portion of FIG. 1 of the drawings. In this way a user can carry with him medication or any fluid or foam toiletry required for cosmetic grooming in an efficient and portable manner.

The frame 4 of the present invention is preferably rectangularly shaped and has 4 corners that are slanted or angled in which the one or more nozzles are provided on the third layer 15 of the housing 1 to dispense fluid. As shown in FIG. 1 the nozzles 18 can be liquid dispensers. Alternatively, as shown in FIG. 2C the one or more nozzles 18 have a cover or lid 9 on them as shown in FIG. 2C

A mirror 29 is preferably located and affixed preferably by adhesive material to a bottom surface of the third layer 15 for use by a user as shown in FIG. 11.

FIGS. 12-17 show another embodiment of the present invention in which the floss dispenser is placed on an exterior surface of the housing 1 and one or more spray nozzles 18 are located and positioned to be sprayed from any chosen desired angle location from either a side of the housing 1 and the one ore more spray nozzles 18 can be positioned at a desired angle to point sideways or downward to dispense fluid and the housing 1 can have any particular geometrical shape including rectangular, square, triangular, circular, parabolic, pyramidal, oval, elliptical wherein:

FIG. 10 shows a nozzle 18 a covering lid 9 for the fluid, foam or drop nozzle 6.

Figure 12:
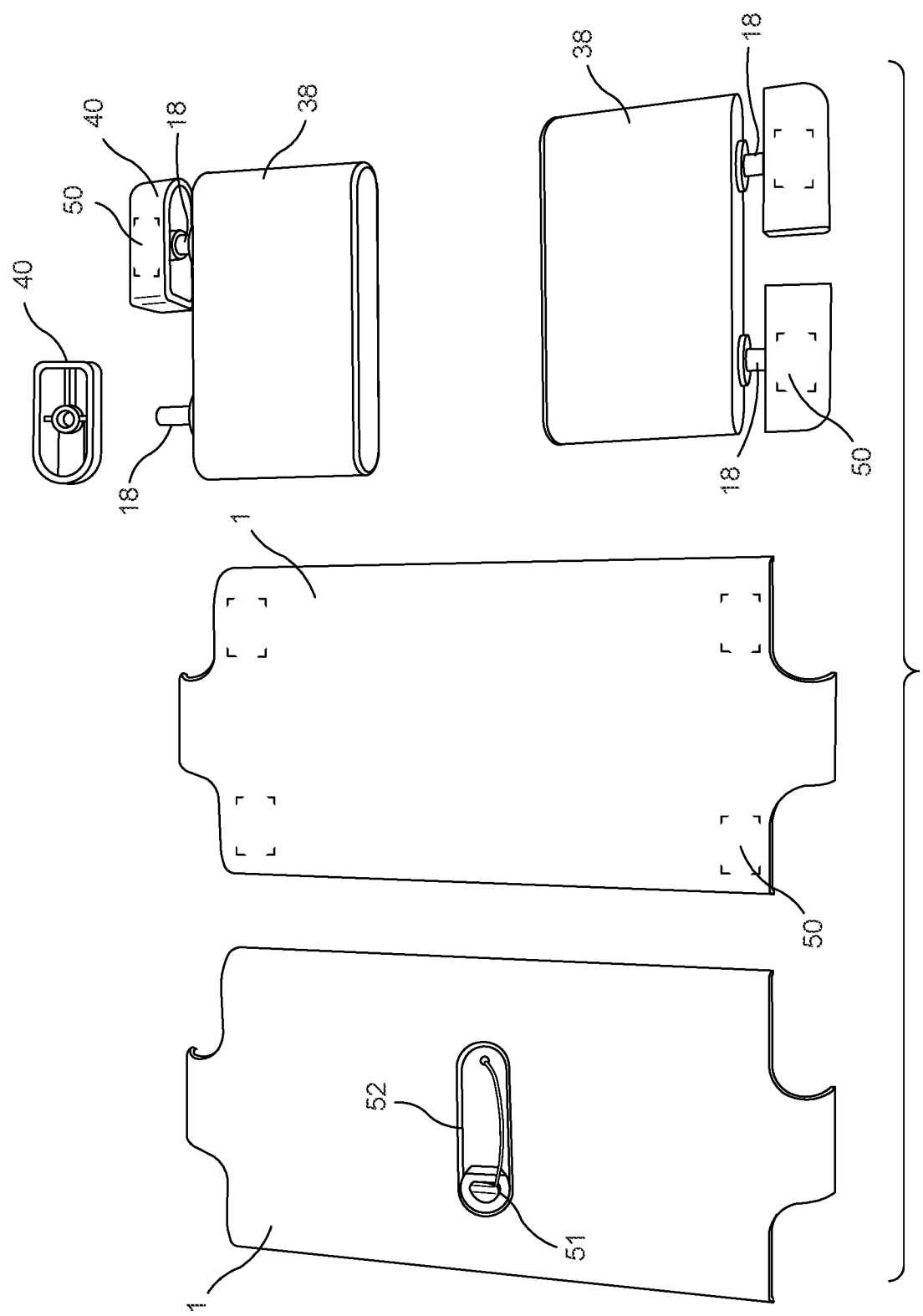
FIGS. 12-17 show another embodiment of the present invention in which the floss dispenser is on an exterior surface of the container and one or more spray nozzles can be positioned or located so as to spray from any desired and positioned angle to dispense fluid wherein the nozzle is chosen to be mounted from either the side of the housing with the one or more spray nozzles pointed and positioned sideways or downward to dispense fluid and the housing can have any particular shape including but not limited to a rectangular, square, oval, triangular, oval, pyramidal or circular shape.

FIG. 12 shows the second embodiment of the present invention with a rectangular shape and one or more spray nozzles 18 that can be located at any desired position to be sprayed from any desired angle from either the side of the housing 1 and the one or more spray nozzles 18 can be located at any desired angle to point it either sideways or downward to dispense fluid. FIG. 12 shows the second embodiment of the present invention with a rectangular shape and spray nozzles 18 that can be located at any desired position to be sprayed from any desired angle from either the side of the housing 1 and the one or more spray nozzles 18 can be located at any desired angle to point it either sideways or downward to dispense fluid. A cutting edge 51 as shown in FIG. 12, preferably made of metallic material and bounded preferably by adhesive material or compressively placed on an edge of the floss dispenser 52, is provided on an edge of the floss dispenser for cutting the floss piece off when dispensed from the floss dispenser 52 mounted on the edge of the floss dispenser 52.

Figure 13:
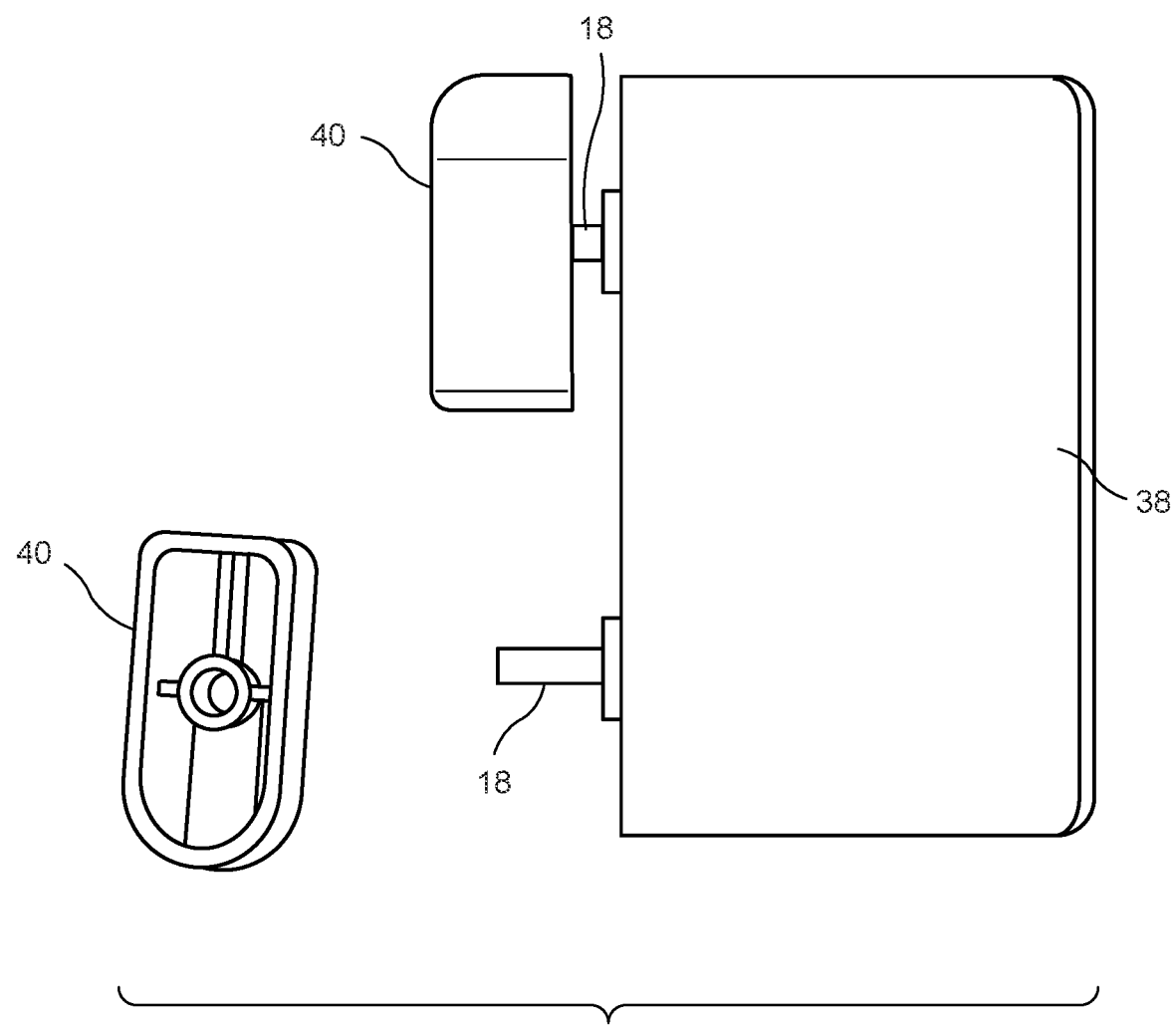

FIG. 13. Shows the floss dispenser on an exterior surface of the housing 1 and the spray nozzles 18.

Figure 14:
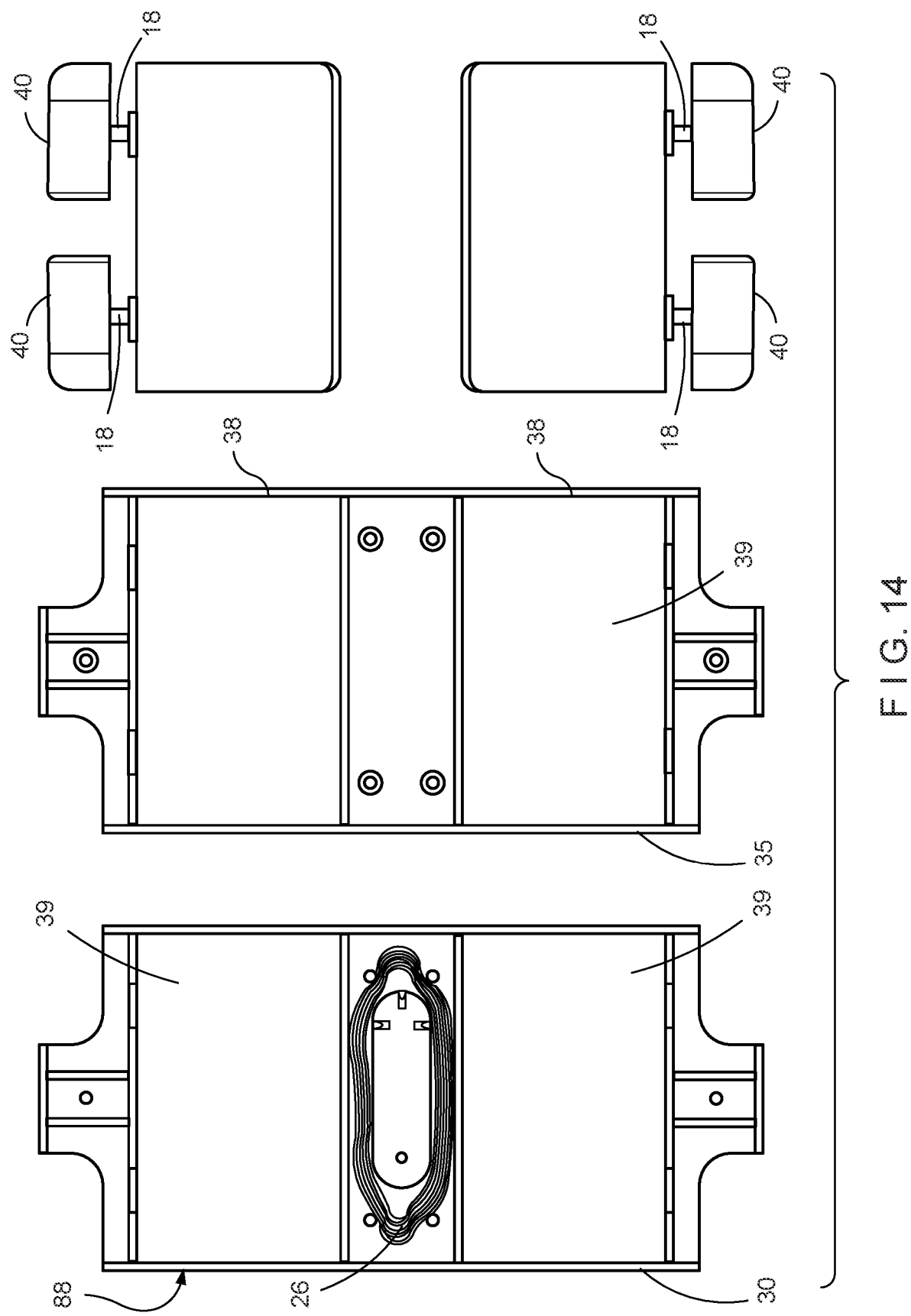

FIG. 14 shows an interior surface of the top 30 and bottom 35 surfaces of the housing 1 with the floss 26 wound inside one of the interior surfaces of the housing 1 and one or more containers and preferably two containers 38, as shown, that are adapted to be placed inside one or more and preferably two hollowed out regions within the interior surfaces of the housing 1 wherein said containers have the nozzles 18 therein which protrude outward from portions of the of the housing 1, preferably the side surface areas when the containers 38 are inserted into the hollowed out regions 39 of the interior surfaces of the housing 1. Caps are provided for placement on top of the nozzles 18 to prevent leaking of fluid when the dispenser is not in use for dispensing fluid. FIG. 14 shows the floss dispenser which is mounted onto an exterior surface, top 30 or bottom 35 of the housing 1.

Figure 15:
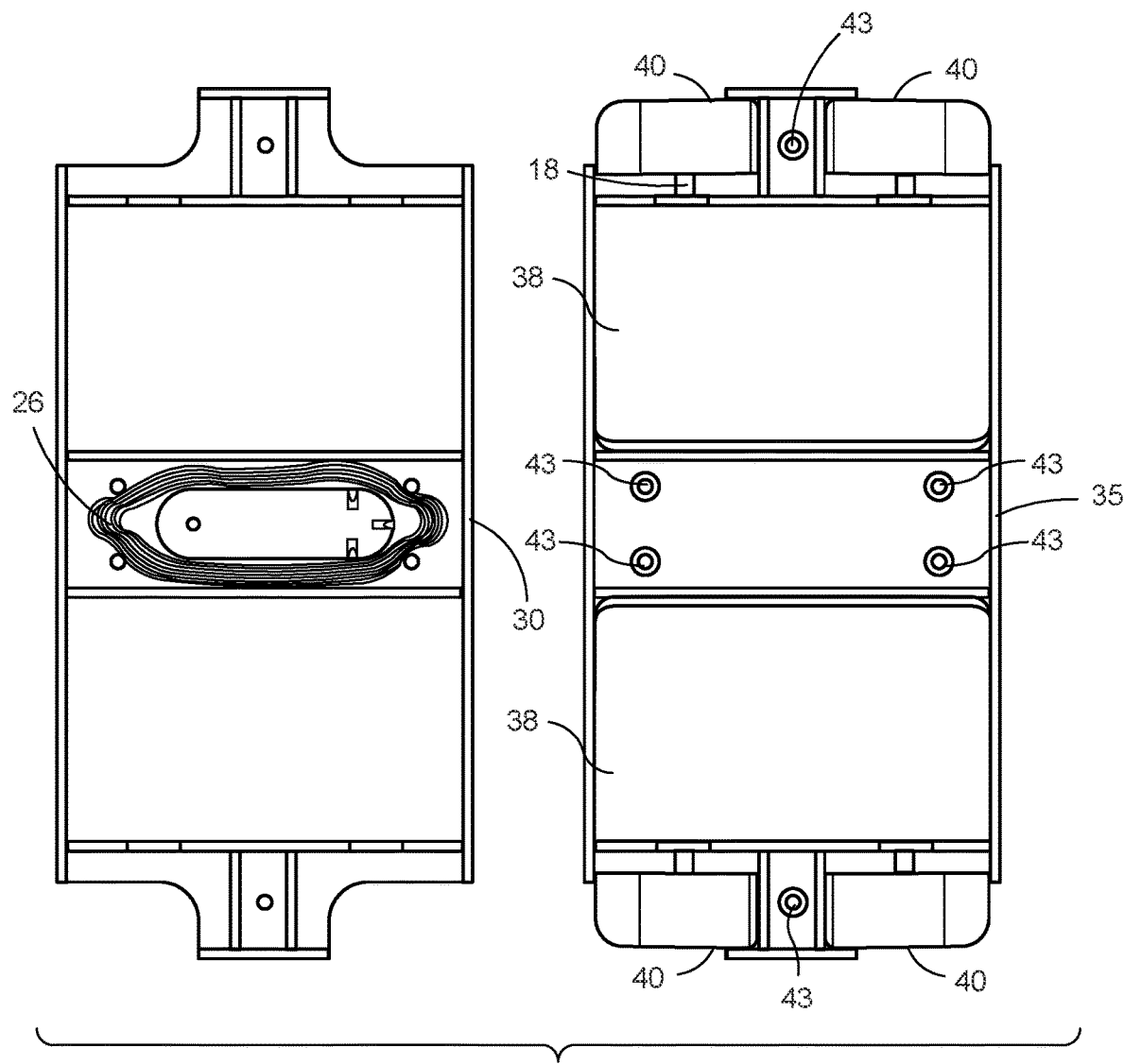

FIG. 15 shows the top 30 and bottom 35 surfaces of the housing 1 with the floss 26 wound and the containers 1 for the nozzles for insertion into the hollowed out regions 39 within the interior surfaces of the housing 1.

Figure 16:
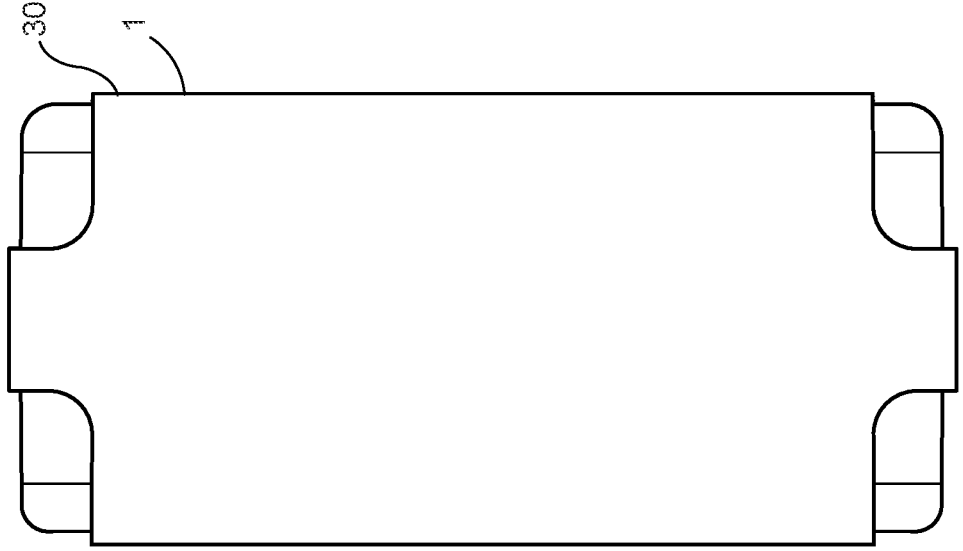

FIG. 16 shows the exterior top surface 30a of the containers 38.

Figure 17:
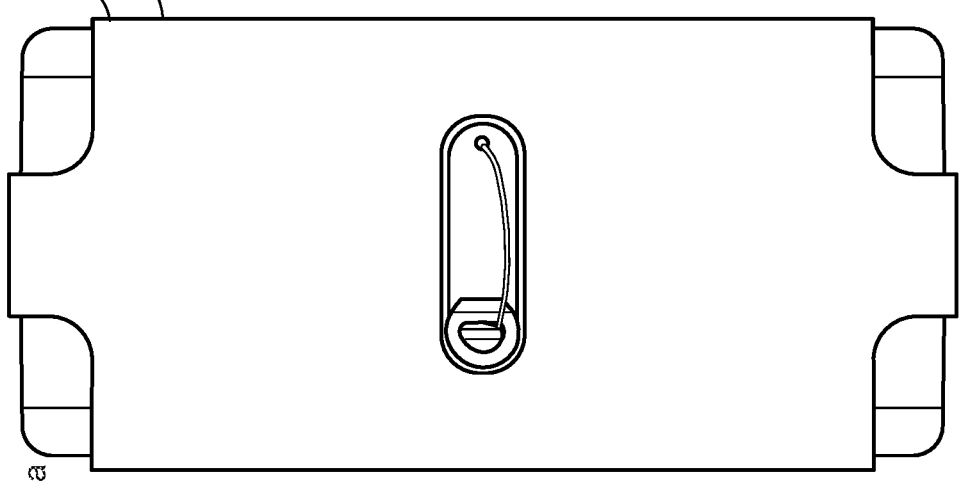

FIG. 17 shows the exterior bottom surface 30b of the container 38.

Figure 18:
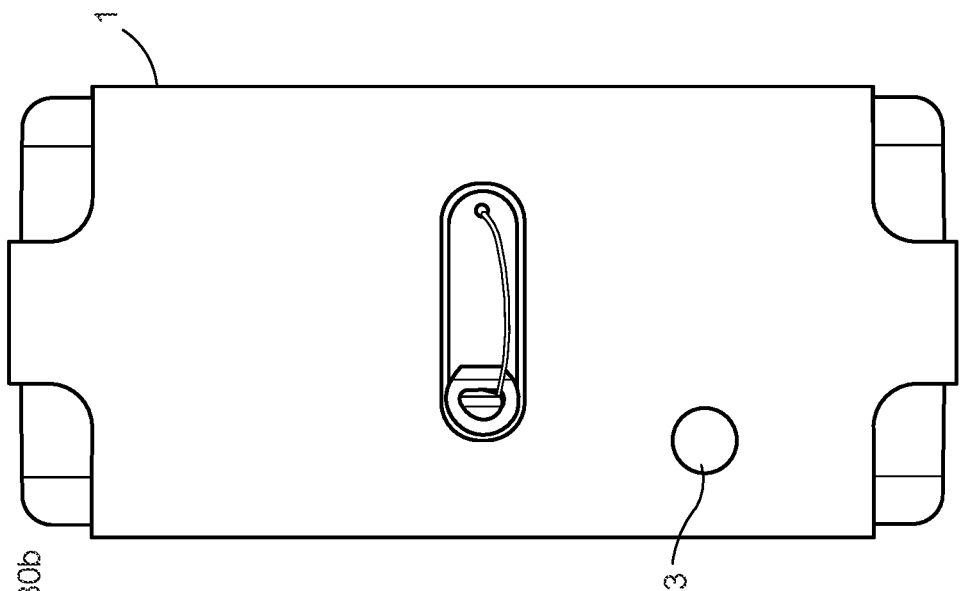
FIG. 18 shows an alternative embodiment for the embodiment of FIG. 12 wherein instead of nozzles, a button located on the housing is pressed which squeezes fluid out of the housing to dispense fluid from an opening on a side of the housing. The button is preferably formed as a section, preferably circular shaped, of a surface of the housing and has a thinner flexible material preferably plastic and preferably polypropylene plastic material which is thinner and more flexible than the remainder of the surface of the housing where the housing is preferably formed of plastic material and preferably polypropylene plastic material. When the button is pressed or squeezed by a user the fluid container within the housing can flow out through one or more openings, apertures, outlets or nozzles including but not limited to the nozzles described in the second embodiment of FIGS. 12-17. The nozzles, outlets, aperture or openings can have removable caps attached to prevent fluid from leaking therefrom when dispensing is not being executed by a user of the present invention.

FIG. 18 shows an alternative or third embodiment for the embodiment of FIG. 12 where the only difference is that instead of one or more nozzles 18 within the containers 38 for dispensing fluid, one or more button 43s, preferably formed of and located on an exterior surface the housing is pressed or squeezed which squeezes fluid out of the housing to dispense fluid from an opening on a side of the housing similar to a squeeze bottle when pressed pushing fluid out of an opening of the bottle, is preferably formed of plastic material and preferably polypropylene plastic material The one or more buttons 43 are located on an exterior surface of said housing 1 which when pressed squeezes fluid out of an opening of a side of said housing to dispense said fluid wherein said one or more buttons 43 are preferably formed as a section, preferably circular shaped, of a surface of the housing and has a thinner flexible material preferably plastic and preferably polypropylene plastic material which is thinner and more flexible than the remainder of the surface of the housing wherein the housing is preferably formed of plastic material and preferably polypropylene plastic material.

In this embodiment, as with the previous embodiment of the present invention, a mirror 29 can be mounted preferably on the bottom exterior surface of the housing. In addition Braille instructions 50, as shown in FIG. 12, can be located preferably next to the nozzle sprays 18 or the one or more buttons 43 that is pressed to release the nozzle spray fluid wherein the Braille instructions 50 indicate the liquid stored for dispensing by the one or more nozzles.

While presently preferred embodiments have been described for purposes of the disclosure, those skilled in the art can make numerous changes in the arrangement of method steps. Such changes are encompassed within the spirit of the invention as defined by the appended claims.

What is claimed:

1. A dispenser configured to dispense fluids and floss, the dispenser being disposable, portable and sized to fit into a pocket of a user, the dispenser comprising:

a frame disposed around two layers and configured to connect and secure the two layers together;

the two layers comprising a bottom layer, and a top layer;

wherein the bottom layer has two or more regions therein and has a plurality of containers, each said one of said plurality of containers containing fluids;

wherein the top layer comprises a plurality of buttons located on an exterior surface of said top layer capable of being pressed downward to exert pressure on said plurality of containers in order to dispense the fluids from the plurality of containers, said plurality of buttons are formed as either a section, or a circularly shape on said exterior surface of said top layer and each has a thin flexible material that is more flexible than the remainder of the exterior surface of said top layer;

said plurality of containers in said bottom layer each having a respective one of said a plurality of nozzles wherein said plurality of nozzles are in fluid communication with the plurality of containers and the nozzles are configured to dispense the fluids as drops, foam, or spray; each of the nozzles are disposed on either a side surface of the bottom layer to dispense fluid from said containers sideways or downward from said bottom layer depending on the positioning of said respective one of said plurality of nozzles;

said top layer has on its exterior surface a floss spindle which, said floss spindle portion has floss material wound about on an interior surface of said top layer for dispensing said floss material by a user.

2. The dispenser according to claim 1 wherein plurality of nozzles include at least one nozzle for dispensing fluid.

3. The dispenser according to claim 1 wherein plurality of nozzles include at least one nozzle for dispensing foam.

4. The dispenser according to claim 1 wherein said plurality of nozzles include at least one nozzle for spraying fluid.

5. The dispenser according to claim 1 wherein said plurality of nozzles include at least nozzle for dispensing eye drop fluid.

6. The dispenser according to claim 1 wherein said plurality of nozzles include at least nozzle for dispensing nasal fluid.

7. The dispenser according to claim 1 wherein said plurality of nozzles include at least one nozzle for dispensing fluid, one nozzle for spraying fluid, one nozzle for dispensing foam and one nozzle for dispensing eye drop fluid and one nozzle for dispensing nasal fluid.

8. The dispenser according to claim 1 wherein said dispenser is made of polypropylene plastic material.

9. The dispenser according to claim 1 wherein said frame is rectangularly shaped.

10. The dispenser according to claim 1 wherein said dispenser has approximately the width and length of a credit card and said containers are sized to fit in said bottom layer.

11. The dispenser according to claim 1 further including at least one button of said plurality of buttons that is pressed to release the nozzle spray fluid from said plurality of nozzles where Braille instructions indicate the liquid stored for dispensing by the one or more nozzles.

12. The dispenser according to claim 1 wherein said two layers are sonically welded together after being assembled to be connected together.

13. The dispenser according to claim 1 wherein said plurality of buttons is formed of plastic material.

14. The dispenser according to claim 1 wherein said plurality of buttons is formed of polypropylene material.

15. The dispenser according to claim 1 wherein Braille instructions indicate the liquid stored for dispensing by said one or more of said plurality of buttons being pressed.

\* \* \* \* \*